(12) United States Patent
Boyd et al.

(10) Patent No.: US 10,288,796 B2
(45) Date of Patent: May 14, 2019

(54) OPTICAL FILM

(71) Applicant: 3M INNOVATIVE PROPERTIES COMPANY, St. Paul, MN (US)

(72) Inventors: Gary T. Boyd, Woodbury, MN (US); Robert M. Emmons, Saint Paul, MN (US); Kenneth A. Epstein, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 29 days.

(21) Appl. No.: 15/568,897

(22) PCT Filed: Apr. 22, 2016

(86) PCT No.: PCT/US2016/028766
§ 371 (c)(1),
(2) Date: Oct. 24, 2017

(87) PCT Pub. No.: WO2016/172428
PCT Pub. Date: Oct. 27, 2016

(65) Prior Publication Data
US 2018/0100963 A1    Apr. 12, 2018

Related U.S. Application Data

(60) Provisional application No. 62/152,486, filed on Apr. 24, 2015.

(51) Int. Cl.
F21V 8/00        (2006.01)
G02B 5/02        (2006.01)
G02B 5/30        (2006.01)

(52) U.S. Cl.
CPC ......... G02B 6/0056 (2013.01); G02B 5/3083 (2013.01); G02B 6/0025 (2013.01);
(Continued)

(58) Field of Classification Search
CPC .. G02B 5/0231; G02B 5/3083; G02B 6/0025; G02B 6/0053; G02B 6/0055; G02B 6/0056; G02B 6/0091
See application file for complete search history.

(56) References Cited

U.S. PATENT DOCUMENTS

RE37,377 E  *  9/2001  Gunjima ................... F21V 9/14
                                                      349/113
7,452,120 B2 * 11/2008  Lee ......................... G02B 5/045
                                                      362/223

(Continued)

FOREIGN PATENT DOCUMENTS

EP    2530515    12/2012
GB    2432428    5/2007
(Continued)

OTHER PUBLICATIONS

International Search Report for PCT International Application No. PCT/US2016/028766, dated Jul. 26, 2016, 5 pages.

*Primary Examiner* — Peggy A Neils
(74) *Attorney, Agent, or Firm* — Michael Stern

(57) ABSTRACT

Optical films are described. In particular, optical films that include top and bottom structured surfaces are described. Films that may be suitable for use in backlights as turning films or recycling films are also described. Optical films described may include reflective polarizers and optically birefringent substrates.

13 Claims, 8 Drawing Sheets

(52) U.S. Cl.
CPC ......... *G02B 6/0053* (2013.01); *G02B 6/0055* (2013.01); *G02B 5/0231* (2013.01); *G02B 6/0091* (2013.01)

(56) References Cited

U.S. PATENT DOCUMENTS

| | | | |
|---|---|---|---|
| 7,864,267 B2 * | 1/2011 | Hirai | G02B 5/0215 |
| | | | 349/62 |
| 8,657,472 B2 | 2/2014 | Aronson | |
| 8,888,333 B2 | 11/2014 | Yapel | |
| 8,947,799 B2 * | 2/2015 | Edmonds | G02B 5/045 |
| | | | 359/831 |
| 2007/0115407 A1 | 5/2007 | Richard | |
| 2007/0132919 A1 | 6/2007 | Hsu | |
| 2008/0137346 A1 * | 6/2008 | Ohta | G02F 1/13362 |
| | | | 362/309 |
| 2011/0221999 A1 | 9/2011 | Shiau | |
| 2011/0234580 A1 | 9/2011 | Wang | |
| 2013/0039077 A1 | 2/2013 | Edmonds | |
| 2014/0367873 A1 | 12/2014 | Yang | |

FOREIGN PATENT DOCUMENTS

| | | |
|---|---|---|
| WO | WO 2008-100057 | 8/2008 |
| WO | WO 2014-031417 | 2/2014 |

* cited by examiner

OPTICAL FILM

CROSS REFERENCE TO RELATED APPLICATIONS

This application is a national stage filing under 35 U.S.C. 371 of PCT/US2016/028766, filed Apr. 22, 2016, which claims the benefit of U.S. Provisional Application No. 62/152,486, filed Apr. 24, 2015, the disclosure of which is incorporated by reference in their entirety herein.

BACKGROUND

Optical films are films suitable for use in lighting or display applications. In some cases, optical films may redirect or recycle (in conjunction with, for example, a back reflector) light incident on the films. Optical films may have one or more optical functions, for example, to increase gain, improve axial brightness, spread light, diffuse or scatter light, or to shape or modify the light incident on it.

SUMMARY

In one aspect, the present disclosure relates to an optical film. The optical film includes a structured top surface with a plurality of substantially linear parallel top structures extending along a first direction, each top structure having a cylindrical surface having a radius of curvature R and a height h, h/R not greater than about 0.4; and a structured bottom surface with a plurality of substantially linear parallel spaced apart bottom structures extending along a second direction different from the first direction, each bottom structure comprising opposing first and second faces, the first face being substantially flat, the second face being curved, and a spacing between adjacent bottom structures being in a range from about 0.5 microns to about 3 microns.

In another aspect, the present disclosure relates to an optical film that includes a structured top surface with a plurality of substantially linear parallel top structures extending along a first direction, where each top structure comprising opposing first and second substantially flat faces meeting at a peak of the structure and forming a peak angle, and the peak angle in a range from about 90 degrees to about 110 degrees. The optical film further includes a structured bottom surface with a plurality of substantially linear parallel bottom structures extending along a second direction different from the first direction, each bottom structure having opposing first and second faces extending from respective opposite first and second ends of a base of the structure and meeting at a peak of the structure, such that in a cross-sectional view of the structured bottom surface in a direction perpendicular to the second direction, the first face is substantially a straight line making a first angle with the base in a range from about 50 degrees to about 70 degrees, the second face is an arc having a radius of curvature in a range from about 40 microns to about 100 microns, and a straight line connecting the second end of the base to the peak of the structure makes a second angle with the base in a range from about 60 degrees to about 80 degrees.

In yet another aspect, the present disclosure relates to a backlight. The backlight includes a light source, a lightguide having an input surface proximate the light source and an output surface, and an optical film disposed on the output surface. The optical film includes a bottom layer having a plurality of substantially linear parallel spaced apart bottom structures extending along a first direction and facing the output surface of the lightguide, a spacing between adjacent bottom structures being in a range from about 0.5 microns to about 3 microns, a top layer having a plurality of substantially linear parallel spaced apart top structures extending along a second direction different from the first direction and facing away from the output surface of the lightguide, a spacing between adjacent top structures being in a range from about 0.5 microns to about 5 microns, and a reflective polarizer disposed between and adhered to the top and bottom layers, the reflective polarizer substantially reflecting light having a polarization state along a third direction and substantially transmitting light having a polarization state along a fourth direction different from the third direction.

In another aspect, the present disclosure relates to an optical film. The optical film includes a structured top surface including a plurality of substantially parallel top structures extending linearly along a first direction and arranged with a first pitch, and a structured bottom surface having a plurality of substantially parallel bottom structures extending linearly along a second direction different from the first direction and arranged with a second pitch, a spacing between adjacent bottom structures in a range from about 0.5 microns to about 3 microns. Each top and bottom structure has opposing first and second faces extending from respective opposite first and second ends of a base of the structure and meeting at a peak of the structure, such that in a cross-sectional view of the structure in a direction perpendicular to the linear extent of the structure, the first and second faces are arcs having a radius of curvature, and a ratio of the radius of curvature to the pitch of the structure in a range from about 0.8 to about 10 for each top structure, and about 1.5 to about 20 for each bottom structure.

In yet another aspect, the present disclosure relates to a backlight. The backlight includes a light source, a lightguide having an input surface proximate the light source and an output surface, and an optical film disposed on the output surface. The optical film includes a first structured surface having a plurality of substantially linear parallel first structures extending along a first direction and facing the output surface of the lightguide, a second structured surface including a plurality of substantially linear parallel second structures extending along a second direction different from the first direction and facing away from the output surface of the lightguide, where each first and second structure has opposing curved first and second faces extending from respective opposite first and second ends of a base of the structure and meeting at a peak of the structure, and the curved first and second faces having different axes of curvature. The optical film also includes a reflective polarizer substantially reflecting light having a polarization state along a third direction and substantially transmitting light having a polarization state along a fourth direction different from the third direction, such that at least 10% of light emitted by the light source and exiting the backlight is recycled by the second structured surface before exiting the backlight.

In another aspect, the present disclosure relates to a multilayer optical film. The multilayer optical film includes an optically birefringent substrate, a plurality of substantially parallel top structures disposed on the optically birefringent substrate and extending linearly along a first direction, a plurality of substantially parallel bottom structures disposed on the optically birefringent substrate opposite the top structures and extending linearly along a second direction different from the first direction, a reflective polarizer disposed between the top structures and the birefringent substrate, the reflective polarizer substantially reflecting light having a polarization state along a third direction and substantially transmitting light having a polarization state along a fourth direction different from the third direction, and a quarter wavelength layer disposed between the top structures and the reflective polarizer. Each top and bottom structure comprises opposing curved first and second faces extending from respective opposite first and second ends of a base of the structure and meeting at a peak of the structure, the curved first and second faces having different axes of curvature.

DETAILED DESCRIPTION

Figure 1:
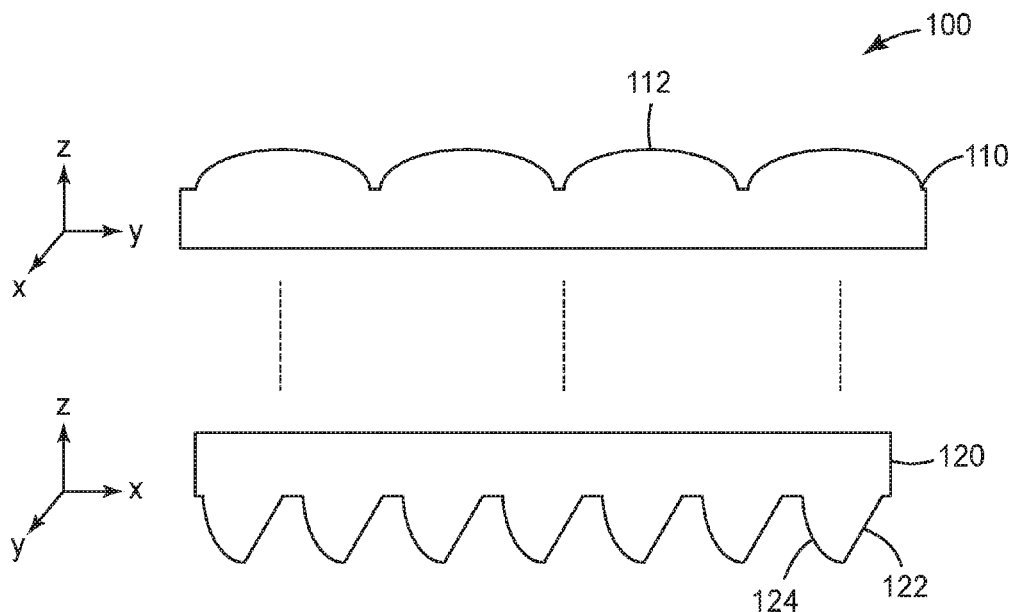
FIG. 1 is a split front-side elevation cross-section of an exemplary optical film.

FIG. 1 is a split front-side elevation cross-section of an exemplary optical film. Optical film 100 includes top structured surface 110 with microstructure 112, and bottom structured surface 120 with microstructures with first face 122 and second face 124.

In FIG. 1, the structured surfaces (top structured surface 110 and bottom structured surface 120) are disposed such that a length direction of the microstructures are generally not parallel. In some embodiments, the length direction of the microstructures are oriented orthogonally from one another. However, in order to more easily depict a simultaneous cross-section of both the top and bottom structured surfaces, FIG. 1 (along with other figures in this application so-annotated) are split front-side elevation cross-sections; that is, as the reference coordinate systems to the left of each structured surface suggest, the figures are actually two perspectives spliced together. The orientation of other components in reference to these structured surfaces is described as is necessary.

Top structured surface 110 includes microstructure 112. In some embodiments, the structured top surface includes a plurality of parallel microstructures. In some embodiments, the parallel microstructures may be linear microstructures. By linear, it is meant that a peak of one of the microstructures is a line across the top structured surface (when viewed, for example, from a top plan view). In some embodiments, and for practical reasons including the limits of manufacturing processes, linear microstructures may include small deviations from precisely linear. In some embodiments, the microstructures may be linear but for a periodic or nonperiodic variation in pitch. In some embodiments, the microstructures may be linear but may vary in height, either periodically or nonperiodically. In some embodiments, there may be space or "land" between adjacent microstructures. In some embodiments, top structured surface 110 includes spacing between adjacent microstructures in a range from about 0.5 µm to about 5 µm. The spacing may be constant or varying.

Microstructure 112 may be substantially curved. In some embodiments, microstructure 112 has a substantially cylindrical or semi-cylindrical shape. In some embodiments, microstructure 112 is a semi-circle or a semi-ellipse along a cross-section orthogonal to the length of the microstructure. In some embodiments, microstructure 112 is characterized by a height h, measured from the peak of microstructure 112 to the base of microstructure 112, along a line orthogonal to the base of microstructure 112. The lowest points on top structured surface 110 may be used to determine the base of microstructure 112. Microstructure 112 may also be characterized by a radius of curvature R, and the ratio of h/R may be any suitable value. In some embodiments, h/R is not greater than 0.4.

Top structured surface 110 may be formed from any suitable method and from any suitable material. For example, top structured surface 110 may be selectively etched or ground. In some embodiments, top structured surface 110 may be formed at least in part through a two-photon mastering process. In some embodiments, top structured surface 110 relies on a cast-and-cure process utilizing an inversely shaped tool. In some cases, top structured surface may be formed from a UV-crosslinkable or UV-curable resin such that appropriate light exposure causes the resin to harden, separate from the mold or tool, and permanently retain its shape. In some embodiments, top structured surface 110 may be formed through an additive process, such as 3D-printing. In some embodiments, top structured surface 110 may be injection molded. Top structured surface 110 may be formed in a monolithic piece of material or it may be formed in a top layer of material disposed on a substrate or a dimensionally stable or warp resistant layer. The material or materials may be selected for their material, physical, or optical properties, such as clarity, scratch or abrasion resistance, warp resistance, birefringence or lack thereof, ability to be microreplicated in, haze, Tg (glass transition temperature), potential to be bonded to other surfaces, or any other suitable characteristic.

Bottom structured surface 120 includes microstructures, each with first face 122 and second face 124. As for top structured surface 110, the microstructures may be linear microstructures; however, recall that the perspective is split in FIG. 1, such that in the exemplary configuration shown in this figure, the microstructures of the top and bottom structures run generally orthogonally to one another. Bottom structured surface 120 may include spaced apart adjacent structures, with a spacing being—in some embodiments—between 0.5 µm and 3 µm.

First face 122 is substantially flat, in that from a cross-section orthogonal to the length of the microstructure, it appears as a straight line. Second face 124 is curved, in that from a cross-section orthogonal to the length of the microstructure, it appears as an arc or curve. In some embodiments, the microstructures may include more than two faces, or two faces and a peak or joining portion, for example. In some embodiments, second face 124 may have a constant curvature, or it may have a piecewise curvature. In some embodiments, second face 124 may have a continuously varying curvature. In some embodiments, each first face may be the same or substantially the same shape and size. In some embodiments, each second face may be the same or substantially the same shape and size. In some embodiments, one or more of the first and second faces may vary in one or more of shape or size, either periodically, non-periodically, or in a gradient.

Optical film 100 may be, overall, formed from any suitable material or combination of materials and have any suitable dimensions. In some embodiments, optical film 100 may be sized or shaped for the particular display or lighting application. The structures on the structured surfaces of optical film 100 may run orthogonally as described, or they may extend or run simply in a first direction and a second direction, where the first direction and the second direction are different from one another. For example, an angle between the first and second direction may be between 78 and 90 degrees. In some embodiments, the top structured surface and the bottom structured surface cover the same area. In some embodiments, top structured surface 110 and bottom structured surface 120 are two sides of the same monolithic film. In some embodiments, the two structured surfaces or their respective substrates are laminated to or attached to each other.

Figure 2:
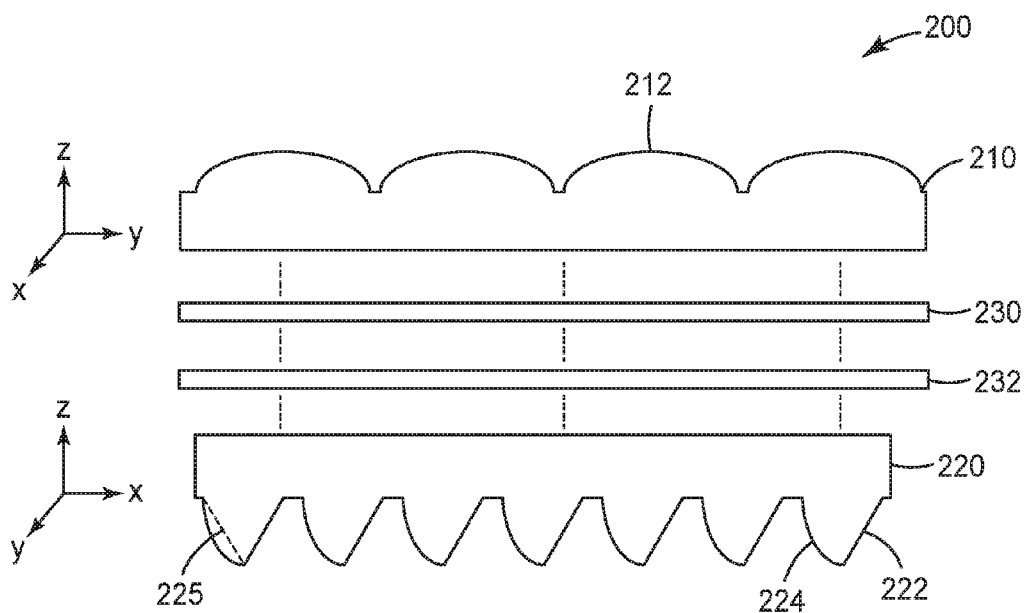
FIG. 2 is a split front-side elevation cross-section of another optical film.

FIG. 2 is a split front-side elevation cross-section of another optical film. Optical film 200 includes top structured surface 210 with microstructure 212, bottom structured surface 222 with microstructures with first face 222 and second face 224 and characterized in part by line 225. Intermediate layers 230 and 232 may or may not be included.

As described with respect to optical film 100 in FIG. 1, optical film 200 includes top structured surface 210 and bottom structured surface 220. The microstructures of the top and bottom structured surface may have some or all of the properties described in conjunction with FIG. 1. The structures of the top and bottom surface extend orthogonally with respect to one another, as is shown with their respectively oriented coordinate systems of this split view.

Disposed between top structured surface 210 and bottom structured surface 220 are intermediate layers 230 and 232. In some embodiments, intermediate layers 230 and 232 may be a single layer. In some embodiments, one or both of intermediate layers 230 and 232 may not be present.

In some embodiments, intermediate layer 230 is a reflective polarizer. The reflective polarizer may be adhered to the top structured surface layer and the bottom structured surface layer. Reflective polarizers are characterized by the at least partial—or in many cases substantial—reflection of a first polarization while largely transmitting a second, orthogonal polarization. In some embodiments, the first polarization may be a linear polarization along a third direction, and the second polarization may be a linear polarization along a fourth direction. The third direction may be the same as the first or second direction, and the fourth direction may be the same as the other one of the first or second directions. In some embodiments, and for some applications, it may be acceptable for the third direction or fourth direction and either the first or second direction to make an angle between 0 and 12 degrees.

In some embodiments, intermediate layer 230 may be a reflective polarizer and intermediate layer 232 may be a quarter wave plate, quarter wave layer, or quarter wave retarder. The quarter wave layer and the reflective polarizer may be stacked or attached in either order and may be referred to together as a polarization management optical stack. In some embodiments, additional layers such as adhesives, protective layers, or diffusion layers may be present. Effectively, the combination of intermediate layers 230 and 232 may function as a circular reflective polarizer, in that the combination at least partially reflects light having a first polarization handedness while largely transmitting the other polarization handedness. The quarter wave plate may be or include, in some embodiments, a liquid crystal polymer. In some embodiments the reflective polarizer may not be present, and the intermediate layers may include only a quarter wave layer.

Reflective polarizers may be multilayer reflective polarizers. Multilayer reflective polarizers are formed from coextruded packets of alternating high and low index layers that, when oriented appropriately, possess internal index of refraction interfaces having appropriate thickness to reflect light of certain polarizations through constructive interference. Examples of reflective polarizers include DBEF and APF, (available from 3M Company, St. Paul, Minn.).

In some embodiments, one or both of intermediate layers 230 and 232 may be birefringent. In some embodiments, one of both of intermediate layers 230 and 232 may include bulk scattering or hazy elements, such as beads, particles, bubbles, or voids. In some embodiments, one or both of intermediate layers 230 and 232 may be a diffuse reflective polarizer. Diffuse reflective polarizers may be formed from an oriented immiscible blend of two polymers, where at least one of the polymers is capable of developing birefringence when stretched. One or both of intermediate layers 230 and 232 may be laminated or adhered to one another. Intermediate layers 230 and 232 may be attached, laminated, or adhered to one or both of the layers including top structured surface 210 and bottom structured surface 220.

The faces of the microstructures of bottom structured surface 220 may be characterized by an angle. The angle is measured between the base (e.g., a line or plane normal to the thickness direction and even with the lowest (or highest, depending on perspective—in any case the base is on the opposite side of the structured surface from the peak) points of bottom structured surface 220) and a line 225 connecting a point on the base nearest the face and the peak of the microstructure. In some embodiments, this angle is between 60 degrees and 80 degrees for curved second face 224 and between 50 degrees to about 70 degrees for flat first face 222. For flat faces, line 225 may be largely or completely coincident with the face, depending on the geometry of the peak. Alternatively, curved faces such as second face 224 may be characterized by one or more radii of curvature. In some embodiments, the curved face may have a single value for its radius of curvature. In some embodiments, the curved face may have two or more sections, each with a different value for its radius of curvature. In some embodiments, the curved face may have a continuously varying radius of curvature. The value or values for the radii of curvature may be within a range from about 40 µm to about 100 µm, or from about 60 µm to about 100 µm.

Figure 3:
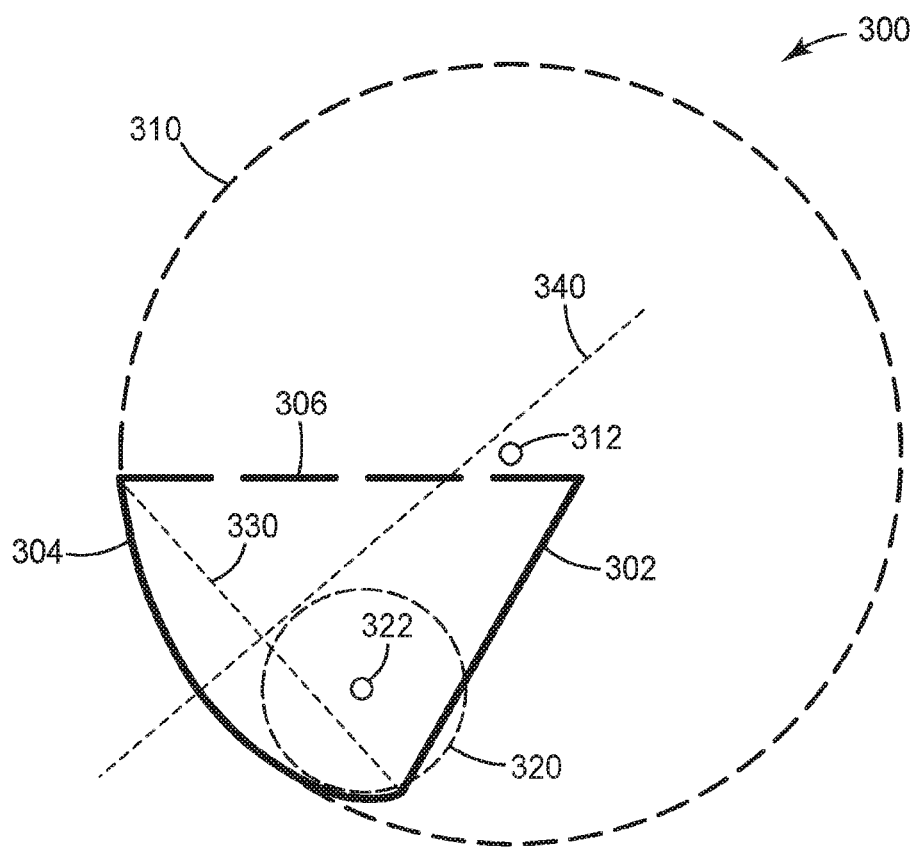
FIG. 3 is a cross-section of an exemplary configuration for the bottom microstructure of the optical films of FIGS. 1 and 2.

FIG. 3 is a cross-section of an exemplary configuration for the bottom microstructure of the optical films of FIGS. 1 and 2. The bottom microstructure has first face 302, second face 304, and base 306. Second face 304 is piecewise curved and characterized in a first part by first circle 310 having first center of curvature 312 and in a second part by second circle 320 having second center of curvature 322. Line 330 connects the intersection of second face 304 and base 306 with the peak of the microstructure. Bisecting line 340 orthogonally bisects line 330.

The two centers of curvature, first center of curvature 312 and second center of curvature 322, are offset from bisecting line 340 that perpendicularly bisects line 330. In some embodiments, there is one center of curvature, and it is offset from bisecting line 340. In some embodiments, there are two or more centers of curvature, and at least one center of curvature is offset from bisecting line 340. In some embodiments, there are many centers of curvature, and at least some are offset from bisecting line 340. In some embodiments, all centers of curvature are offset from bisecting line 340.

In some embodiments, each microstructure on a structured surface of an optical film have faces with centers of curvature that meet certain of the criteria outlined herein. In some embodiments, a plurality of microstructures on a structured surface of an optical film have faces with centers of curvature that meet certain of the criteria.

Figure 4:
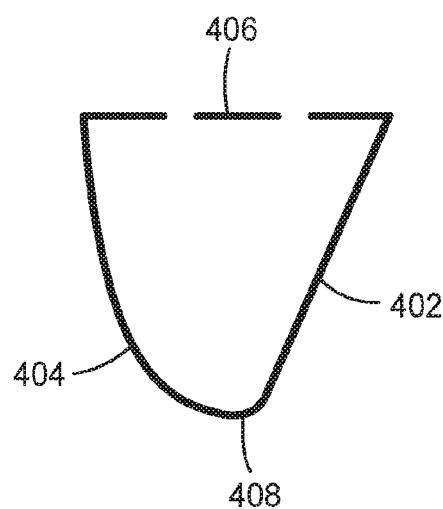
FIG. 4 is a cross section of another configuration for a bottom microstructure.

FIG. 4 is a cross section of another configuration for a bottom microstructure. The bottom microstructure has first face 402, second face 404, base 406, and peak 408. FIG. 4 illustrates that the microstructure design may not necessarily have a sharp peak, in contrast to those depicted in FIGS. 1-3. Peak 408 may be rounded, curved, or flat, and may be characterized by its geometry, including its width and radius of curvature. Peak 408, when curved, may be simply curved, or may be piecewise or continuously curved. In some embodiments, the peak is an arc having a radius of curvature in a range from 0.1 µm to 5 µm.

Figure 5:
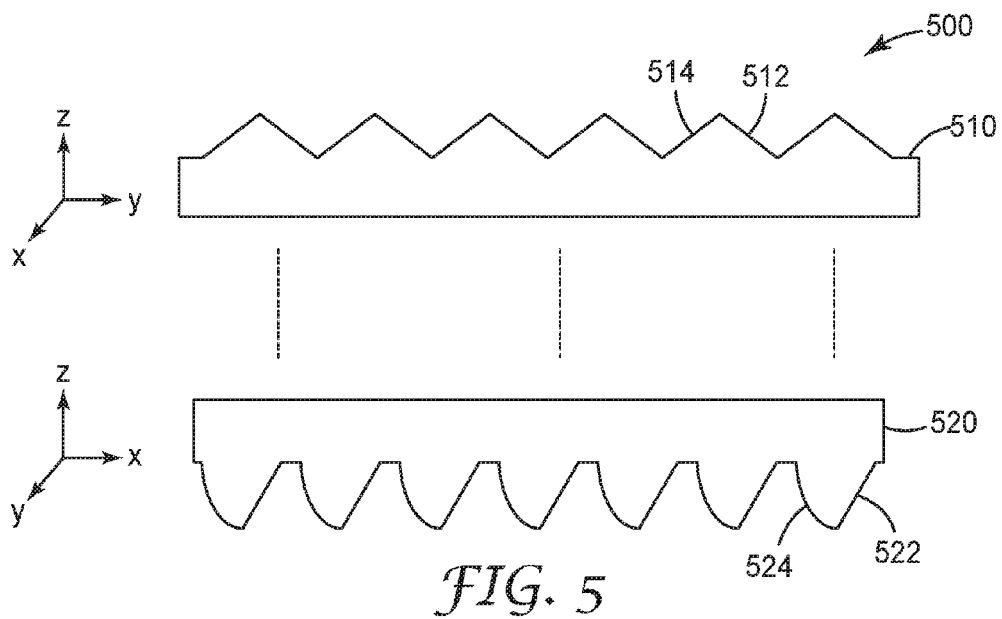
FIG. 5 is a split front-side elevation cross-section of another exemplary optical film.

FIG. 5 is a split front-side elevation cross-section of another exemplary optical film. Optical film 500 includes top structured surface 510 with microstructures having first face 512 and second face 514. Bottom structured surface 520 has microstructures having first face 522 and second face 524. FIG. 5 is similar to FIG. 1, except that top structured surface 510 has microstructures including first face 512 and second face 514. The top faces are flat or substantially flat (e.g., within manufacturing tolerances for flatness). The top faces, first face 512 and second face 514, meet at a peak of the microstructure forming a peak angle therebetween. In some embodiments, the peak angle is within five degrees of 90 degrees. In some embodiments, the peak angle is in a range from 90 degrees to 110 degrees. The microstructures of top structured surface 510 may have a rounded, faceted, or shaped peak.

Figure 6:
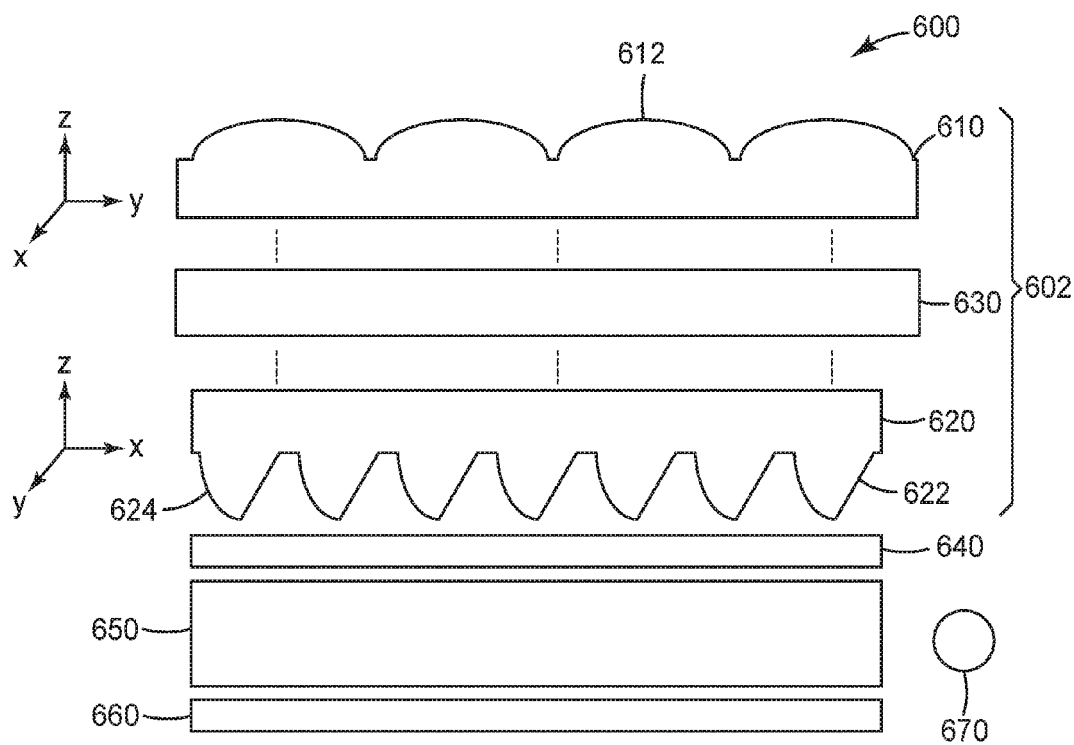
FIG. 6 is a split front-side elevation cross-section of a backlight including an optical film.

FIG. 6 is a split front-side elevation cross-section of a backlight including an optical film. Backlight 600 includes optical film 602 having top structured surface 610 with microstructure 612, bottom structured surface 620 including first face 622 and second face 624, and optional intermediate layer 630. Backlight 600 further includes buffer layer 640, lightguide 650, reflector 660, and light source 670.

Optical film 602 is similar to those depicted in FIGS. 1 and 2, including top structured surface 610 with microstructure 612 and bottom structured surface 620 facing the output surface of the lightguide and including microstructures with first face 622 and second face 624. Optical film 602 also includes intermediate layer 630, which correspond with intermediate layers 230 and 232 as shown in and described in conjunction with FIG. 2. In this sense, intermediate layer 630 in FIG. 6 is simplified and, as such, may represent both the quarter wave plate and the linear reflective polarizer although these are treated as separate layers in FIG. 2. Optical film 602 may be a monolithic layer or it may be formed from several laminated portions or layers. Any other optical films described herein may be substituted for or features thereof incorporated in optical film 602.

The rest of backlight 600 includes buffer layer 640 disposed between optical film 602 and lightguide 650, lightguide 650 itself, reflector 660, and light source 670.

Buffer layer 640 may be formed from optically transparent polymeric materials and may have any suitable dimensions. In some embodiments, buffer layer 640 may cover substantially all of the area of lightguide 650 or optical film 602. In some embodiments, buffer layer 640 may be designed to prevent physical damage to lightguide 650 or the peaks of bottom structured surface 620. Damage may include scratching or even bending or breaking of portions of the structured surface, for example after experiencing a shock, such as an impact or collision. In certain applications buffer layer 640 may have physical properties that make it advantageous for shock absorption, such as characteristics that make it appropriately cushioning.

In some embodiments, buffer layer 640 may have a structured surface. In some embodiments, buffer layer 640 may have two structured surfaces. Buffer layer 640 may include a bottom structured surface that imparts very low haze, such as less than 10%, less than 5%, or even less than 1%. Haze as used herein is the value reported through the proper operation of a HAZE-GARD PLUS hazemeter, (available from BYK-Gardner USA, Columbia, Md.). In some embodiments, this low-haze structured surface may provide advantageous anti-wetout properties to the buffer layer vis-à-vis the lightguide.

In some embodiments, buffer layer 640 may have a structured surface that diffuses light or imparts some haze. In some embodiments, the hazy structured surface may cover a portion of the top surface. In some embodiments, the hazy structured surface may only cover a small portion (in some embodiments, no more than 10%) of the top surface nearest the edge closest to the light source. The haze of the small edge portion may be greater than 30%, 50%, or 70%. In some embodiments, the structured surface has a hazy portion covering a small portion of a surface and another portion with lower haze covering some or all of the rest of the surface.

The structured surface may be formed from any suitable process, including a cast-and-cure method against a tool. The tool may be formed from any process or combination of processes including, for example, masking and etching, reactive ion etching, diamond turning, electroplating, coating a tool with beads, or photolithography including one- and two-photon processes.

In some embodiments, buffer layer 640 may be laminated or attached to one or more of lightguide 650 and optical film 602. Buffer layer 640 may be attached to lightguide 650, for example, with a layer of pressure sensitive or optically clear adhesive, or through one or more pieces of edge or rim tape. In some embodiments, buffer layer 640 may be bonded to lightguide 650 with a low index adhesive layer. Such a low index adhesive layer may include a plurality of voids.

In some embodiments, buffer layer 640 may include an antireflection coating or surface structure (such as a moth's eye structure) on one or both sides. Particularly in configurations where there is an air gap between buffer layer 640 and an adjacent layer or layers, such an antireflection treatment may reduce Fresnel reflections and may increase the overall brightness of backlight 600.

Buffer layer 640 is optional in many configurations, and its removal naturally allows for thinner backlight designs. Without the buffer layer, light may be specularly transmitted from the output surface of lightguide 650 to the bottom structured surface of optical film 602.

Lightguide 650 may be any suitable size or shape, and may be formed from any suitable material. In some embodiments, lightguide 650 may be formed from an injection molded monolithic piece of acrylic, for example, or it may be formed from any other suitable material. Lightguide 650 may have its material selected for advantageous optical characteristics, such as high transmission, low absorption, or low scattering, or physical characteristics such as rigidity, flexibility, or temperature and warp resistance. In some embodiments, lightguide 650 may be a wedge lightguide. In some embodiments, lightguide 650 may include or contain extraction features, such as printed dots, negative microfeatures (i.e., indentations where the air/lightguide interface tends to defeat total internal reflection by scattering or reflecting light at subcritical angles, which then passes through the other surface of the lightguide), or positive microfeatures. The extraction features may be arranged in a gradient pattern so that light is evenly extracted over the area of the lightguide (and, ultimately, backlight 600 overall). In other words, the extraction features may be less densely packed in portions of the lightguide that have more overall light, such as the area proximate the light source. Alternatively, for some applications, the extraction features may be more densely packed in areas where greater light output is desired, such as under the numbers or buttons on a phone keypad or the like. The extraction features may vary in size, shape, and number either periodically, in a gradient, or non-periodically.

Reflector 660 is any suitable layer that is a broadband reflector of light. In some embodiments, reflector 660 is a metallic reflector, such as aluminum or silver, or a substrate with a metallic reflecting surface deposited thereon. In some embodiments, reflector 660 is a multilayer optical film.

Similarly to the multilayer optical film reflective polarizer described herein, the multilayer optical film reflector includes alternating high and low index layers of polymeric materials carefully selected and capable of developing birefringence when oriented. The layers are coextruded and oriented such that a broad spectrum of light is reflected by the interfaces between the layers through constructive interference. The optical thickness of each layer pair is designed such that different layer pairs contribute to the reflection of different wavelengths of light. An exemplary multilayer optical film reflector is Enhanced Specular Reflector, or ESR (available from 3M Company, St. Paul, Minn.). Suitable reflectors may reflect at least 90% of light, 95%, 98% of light, or even 99%. The reflector may provide a reflection pattern characterized as diffuse (or even Lambertian), specular, or semi-specular.

Light source 670 may be any suitable light source or combination of light sources. Conventional light sources such as light emitting diodes (LEDs), cold cathode fluorescent lamps (CCFLs), and even incandescent bulbs may be used. In some embodiments, although light source 670 is depicted as a single object in FIG. 6, combinations of LEDs may be used to provide a sufficiently white input light, but, depending on the application, any suitable spectra or combination of spectra may be utilized. In some embodiments, the LEDs may use phosphors or other downconverting elements. Light source 670 may include suitable injection or collimation optics to aid in coupling light into lightguide 650 or to help shape the light input for the lightguide. Light source 670 may be disposed on either side of lightguide 650: for example, it may be disposed such that light from light source 670 exiting the lightguide is incident first on the flat first faces, or, alternatively, light from light source 670 exiting the lightguide is incident first on the curved second faces. The rest of the components of backlight 600 can be adjusted accordingly.

Depending on the application, certain characteristics of the overall design of backlight 600 may have a significant impact on its performance. In particular, the design of the bottom structured surface 620 of optical film 602 and the output distribution of lightguide 650. The design of lightguide 650 may take into account that optical film 602 may have certain input angles that provide a more desirable output than certain other input angles; in other words, the lightguide and backlight overall may be designed to provide optical film 602 with these input angles. The opposite is also possible: optical film 602 may be designed to have the output angle of the lightguide be an input angle that provides a desirable output.

In some embodiments, some level of diffusion or haze is desirable for the hiding of visual defects from manufacturing, assembly, or through use and environmental exposure or for visual interference such as moiré patterns. Optical film 602 may include a surface diffusing structure on the bottom structured surface or on the top structured surface. Such a surface diffusing structure may be on all or only some of the structured surfaces; for example, a surface diffusing structure may be on only one side of the structures. In some embodiments, the surface diffusing structure may be between the structured surface and the underlying substrate. Alternatively or additionally, any of the structures of the structured surfaces, their substrates, or any intermediate layers may have a bulk diffusing or scattering element. In some embodiments, optical film 602 may include an embedded matte layer; i.e., a diffusing layer between the structured surface and the underlying substrate having an index of refraction different than at least one of the structured surface layer and its underlying substrate.

A quantity for characterizing either the surface diffusing structure is the slope distributions of the surface. Slope distributions provide a particularly useful characterization of the surface diffusing structure in embodiments where it is desired to have relatively shallow slopes (for example, most slopes less than 40 degrees). In some embodiments, no more than about 20 percent, or no more than about 10 percent, or no more than about 7 percent, or no more than about 5 percent, or no more than about 3 percent of the surface diffusing structure has a slope magnitude that is greater than about 20 degrees, greater than about 15 degrees, greater than about 10 degrees, or greater than about 7 degrees, or greater than about 5 degrees, or greater than about 3.5 degrees. In some embodiments, the surface diffusing structure may have steeper slopes. For example, in some embodiments, no more than about 20 percent, no more than about 10 percent, no more than about 7 percent of the surface diffusing structure has a slope magnitude that is greater than about 20 degrees, or greater than about 30 degrees, or greater than about 35 degrees or greater than about 40 degrees. In some embodiments, a substantial fraction of surface diffusing structure has a slope magnitude greater than 1 degree and a substantial fraction of the second major surface has a slope magnitude less than 10 degrees or less than 15 degrees. In some embodiments, at least about 50 percent, or at least about 70 percent, or at least about 80 percent, or at least about 85 percent, or at least about 90 percent of the surface diffusing structure has a slope magnitude that is greater than 1 degree.

In some embodiments, no more than about 85 percent, or no more than about 80 percent, of the surface diffusing structure has a slope magnitude that is greater than about 15 degrees, or that is greater than about 10 degrees.

In some embodiments, the slope distributions may be measured separately along two orthogonal directions. These slopes may have very small magnitudes along one direction, and larger magnitudes along a second, orthogonal direction. In other words, the slope distributions may be asymmetric. In some embodiments, the slopes along one direction may have magnitude distributions as described above (except while there applied there to the entire surface, here along a single direction). In some embodiments, there may be a very narrow distribution of slopes around zero or some other constant, or no slope (e.g., a flat or constant slope) along one direction. In some embodiments, at least 50 percent, at least 70 percent, at least 80 percent, at least 85 percent, or at least 90 percent of the slope magnitudes along one direction are less than 0.5 degrees, or less than 0.1 degrees. In some embodiments, at least 50 percent, at least 70 percent, at least 80 percent, at least 85 percent, or at least 90 percent of the slope magnitudes along one direction are less than 0.5 degrees, or less than 0.1 degrees from a same non-zero slope. In some embodiments, the asymmetrically larger slope distribution direction may be orthogonal to the direction of the linearly extended direction of the top structures or the bottom structures (i.e., along the x- or y-axis) or the larger slope distribution direction may be parallel to the direction of the linearly extended direction of the top structures or the bottom structures.

The slopes of the structured surface can be characterized using atomic force microscopy (AFM) or confocal scanning laser microscopy (CSLM), for example, to determine a surface profile H(x,y) (i.e., a height, H, of the surface above a reference plane as a function of the orthogonal in-plane coordinates x and y). Slopes $S_x$ and $S_y$ along respective x- and y-directions can then be calculated from the following two expressions:

$$S_x = \partial H(x,y)/\partial x$$

$$S_y = \partial H(x,y)/\partial y.$$

The slope magnitude $S_m$ can be calculated from the following expression:

$$S_m = \sqrt{[\partial H/\partial x]^2 + [\partial H/\partial y]^2}.$$

A cutting tool system used to cut a tool which can be microreplicated to produce a surface diffusing structure may employ a thread cut lathe turning process and includes a roll that can rotate around and/or move along a central axis by a driver, and a cutter for cutting the roll material. The cutter is mounted on a servo and can be moved into and/or along the roll along the x-direction by a driver. In general, the cutter is mounted normal to the roll and the central axis and is driven into the engraveable material of roll while the roll is rotating around the central axis. The cutter is then driven parallel to the central axis to produce a thread cut. The cutter can be simultaneously actuated at high frequencies and low displacements to produce features in the roll that when microreplicated result in surface diffusing structures. The cutter can be any type of cutter and can have any shape that may be desirable in an application. Suitable cutters are described in U.S. Pat. No. 8,657,472 (Aronson et al.) or U.S. Pat. No. 8,888,333 (Yapel et al.).

Optical film 602 may be configured such that at least some of the light emitted by light source 670 that eventually exits backlight 600 is recycled by top structured surface 610. By recycled, it is meant that the light is reflected or otherwise redirected back toward lightguide 650. Such light may be reflected by reflector 660 and directed back toward optical film 602. Because at least some of the light redirected by top structured surface 610 is not at a preferred viewing angle or may not otherwise be at a useable or desirable angle, the redirection may be referred to as recycling because the light is cycled again through the backlight. In some embodiments, at least 10% of the light emitted by light source 670 is recycled by top structured surface 610. In some embodiments, at least 20% of the light emitted by light source 670 is recycled by top structured surface 610.

Figure 7:
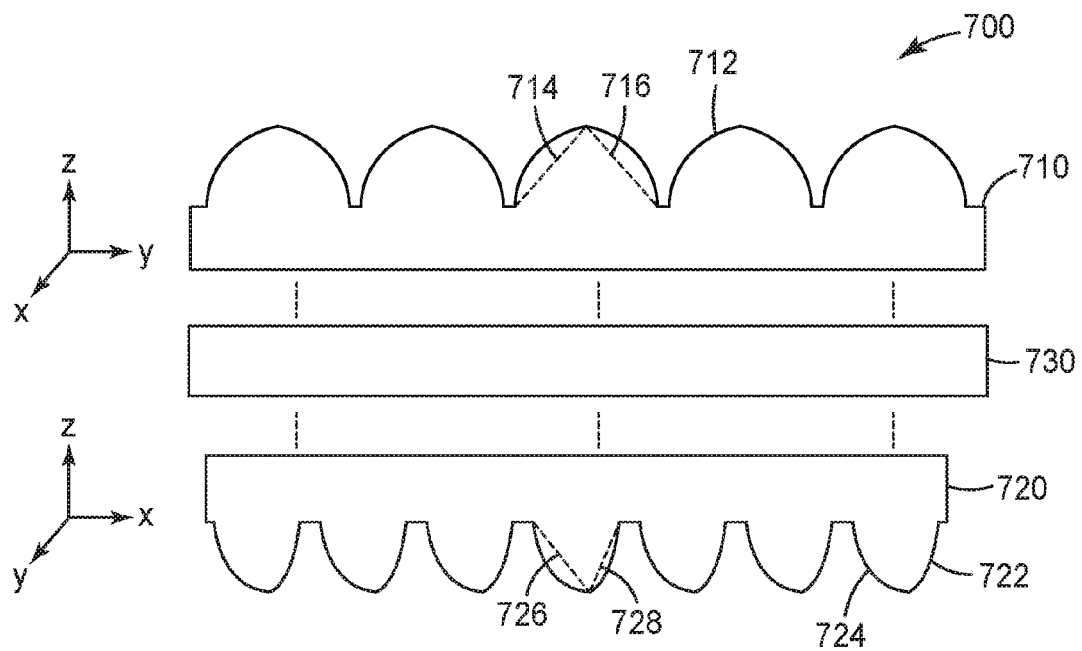
FIG. 7 is a split front-side elevation cross-section of another optical film.

FIG. 7 is a split front-side elevation cross-section of another optical film. Optical film 700 includes top structured surface 710 with microstructure 712 characterized by first top line 714 and second top line 716, bottom structured surface 720 with microstructures having first face 722 and second face 724, and characterized by first bottom line 726 and second bottom line 728. Optical film 700 may also include intermediate layer 730.

Optical film 700 of FIG. 7 is similar to optical film 200 of FIG. 2, or optical film 602 of FIG. 6, except that microstructure 712 is characterized by first top line 714 and second top line 716 and microstructures of bottom structured surface 720 have two faces that are arcs or otherwise curved and are characterized by first bottom line 726 and second bottom line 728. In some embodiments, microstructures of the top structured surface 710 may have two faces that are arcs or otherwise curved, as depicted and described for the microstructures of the bottom structured surface 720. The curved faces (of either the top or bottom structures) may have the same radius of curvature or they may have different radii of curvature. In some embodiments, the curved faces of either the top or bottom structures may have a same center of curvature, but in some embodiments they may have different centers of curvature. In some embodiments they may have a piecewise curvature or a varying curvature. In some embodiments, each face of each microstructure 712 of top structured surface 710 may have a radius of curvature between 20 µm and 40 µm. In some embodiments, each face of each microstructure of bottom structured surface 720 may have a radius of curvature between 40 µm and 80 µm or between 60 µm and 80 µm. In some embodiments, the centers of curvatures for all the cross sections of a face of a structure taken across the direction the structures extend may be considered together and referred to as an "axis" of curvature. In some embodiments, a face having piecewise curvature may have multiple axes of curvature for each face. In some embodiments, the axes of curvature of the curved faces are different. In some embodiments, each of the axes of curvature of each the curved faces are different.

First top line 714 and second top line 716 are lines connecting the intersection of the first and second ends of the base of microstructure 712 with the peak of the microstructure. In some embodiments, the first top line 714 and second top line 716 may form an angle with themselves, that angle being in a range between about 60 degrees and 120 degrees. The first and second top lines may form an angle between themselves and the base of the microstructure, and that angle may be between 5 and 60 degrees, or between 35 and 45 degrees. The angles between the lines and the base may be the same or different for the two top lines.

First bottom line 726 and second bottom line 728 are, similarly, lines connecting the intersection of the first and second ends of the bottom microstructure (i.e., where first face 722 and second face 724 intersect with the base of the microstructure) to the peak of the microstructure. First bottom line 726 and second bottom line 728 may form an angle between themselves in a range from 60 degrees to 130 degrees. The first and second bottom lines may form and angle between themselves and the base of the microstructure, and that angle may be between 25 and 88 degrees, or between 55 and 65 degrees. The angles, either between the lines and the base or between the lines themselves, may be the same or different for the two bottom lines.

In some embodiments, where the peak is rounded or curved, it may be preferable to characterize the angle formed between, for example, first bottom line 726 and second bottom line 728, except that the first and second bottom lines connect the first and second ends, respectively, and instead run tangent to their respective sides of the curved peak. The angle formed at the point where they eventually intersect may be in a range between 50 degrees and 70 degrees. In some embodiments, any radius of curvature of the peak of the top and bottom microstructures is smaller than the radius of curvature for either of the faces or sides (not including the peak) of that particular microstructure.

Depending on the application, certain geometric characteristics, and in particular the geometric characteristics of the structured surfaces, may be especially suitable for the optical films described herein. For example, in FIG. 7, each of the structures on the top and bottom of the optical film may have first and second faces that, from the view of a cross-section perpendicular to the linear extent of the structures, are arcs that do not have a same center of curvature. In some embodiments, the structures are spaced apart with a certain pitch measured from, for example peak to peak. In some embodiments, a first pitch of the top structured surface and a second pitch of the bottom structured surface is between 10 and 100 µm, or between 10 and 50 µm. In some embodiments, either the top structured surface or the bottom structured surface has a variable pitch. In some embodiments, the pitches may be expressed in relation to the radii of curvature of each of the faces of the structures on the corresponding structured surface. In some embodiments, a ratio of a radius of curvature of the first and second faces of structures of a structured surface to the pitch of the structured surface is between 0.8 and 10, 1.5 and 20, 1 and 3, or between 2 and 5. In some embodiments, that ratio may be between 0.8 and 10 for the top structured surface, and between 1.5 and 20 for the bottom structured surface. In some embodiments, that ratio may be between 1 and 3 for the top structured surface, and between 2 and 5 for the bottom structured surface. In some embodiments, the height of at least one of the structures varies along the linear extent of the structure.

EXAMPLES

Example 1 (Comparative)

A computer model was developed to evaluate the response to an input light distribution of films designed for turning light. The software that was used was a non-sequential ray tracing package similar to that available from Trace Pro (from Lambda Research Corporation) or Light-Tools (from Synopsis). The first film considered was a conventional turning film that had inverted prisms with linear facets on its bottom side with pitch 24 microns, apex angle of 64 degrees and refractive index of 1.5. On the top side of the film, opposite the prisms, was a matte surface. A specular reflector is included below the light source in all of the simulation examples.

Figure 8:
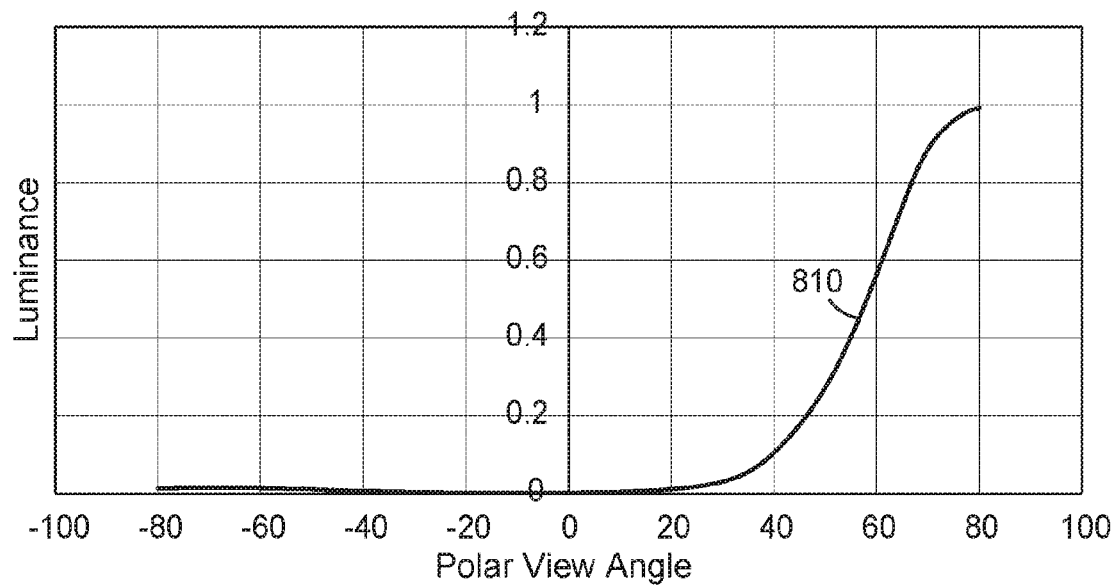
FIG. 8 is a plot showing input luminance versus polar angle for a simulated lightguide.
Figure 9:
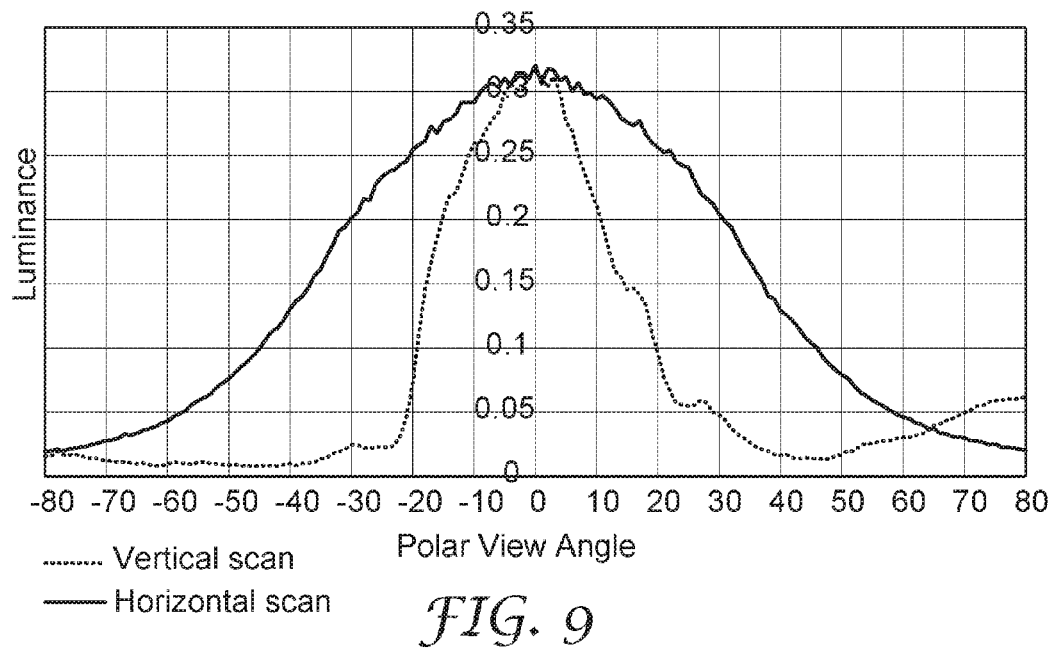
FIG. 9 is a plot showing horizontal and vertical scans of Example 1 (Comparative).

The computer model used the light input angle distribution whose vertical scan of output light is shown as line 810 in FIG. 8 and computed horizontal and vertical scans of output light coming through the film shown in FIG. 9.

The results demonstrate the significant difference in the extent of the viewing angle for the horizontal and vertical directions. This can be a severe limitation for the use of conventional turning film in mobile displays where portrait and landscape orientations are desirably as equivalent as possible in viewing angle.

A further computer model was carried out, simulating a defect on the lightguide top surface. Images were generated of the defect looking through the film, to discern the ability of the film to diffuse the defect image. In this example, the defect was clearly visible.

Example 2

The computer model was exercised as in Example 1 with the conventional turning film replaced by a film whose top structure had symmetric curved prisms with chord base angle (the angle from the plane of the film of the line that joins the end points of the facet curve) of 40 degrees, radius of curvature of the facets of 30 microns, pitch of 24 microns and a refractive index of 1.565.

The bottom film had symmetric inverted prisms with curved facets having a chord base angle of 61 degrees, facet radius of curvature of 75 microns, a gap of 2 microns between prisms, and a refractive index of 1.5. The prisms of the bottom film ran perpendicular to the structures of the top film.

Figure 10:
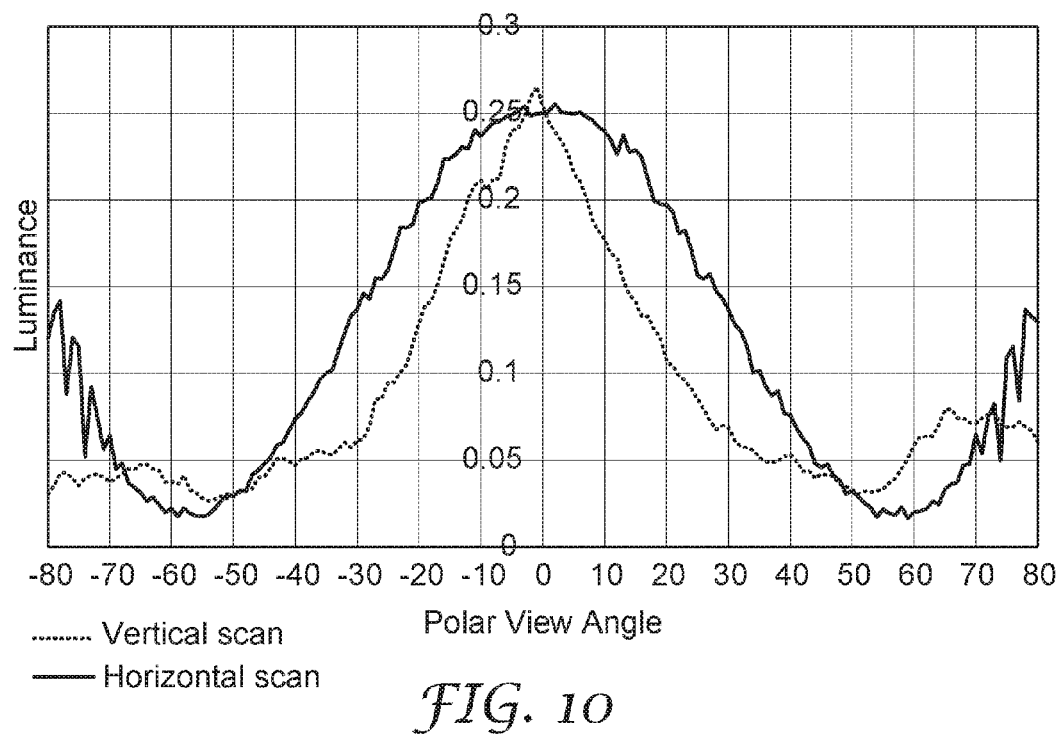
FIG. 10 is a plot showing horizontal and vertical scans of Example 2.

Using the same input angle distribution as in Example 1, the model-determined horizontal and vertical light output scans were computed and are shown in FIG. 10.

This result represents a significant improvement in the symmetry of viewing a display, over a conventional turning film.

A further computer model was carried out, simulating a defect on the lightguide top surface. Images were generated of the defect looking through the film, to discern the ability of the film to diffuse the defect image. In this example, the defect was significantly less visible than in Example 1.

Example 3

The computer model was exercised as in Example 2 except that the structures of the top film had a curved cross section bounded by a circular arc with a ratio of height to radius of curvature of 0.4 and a pitch of 24 microns.

Figure 11:
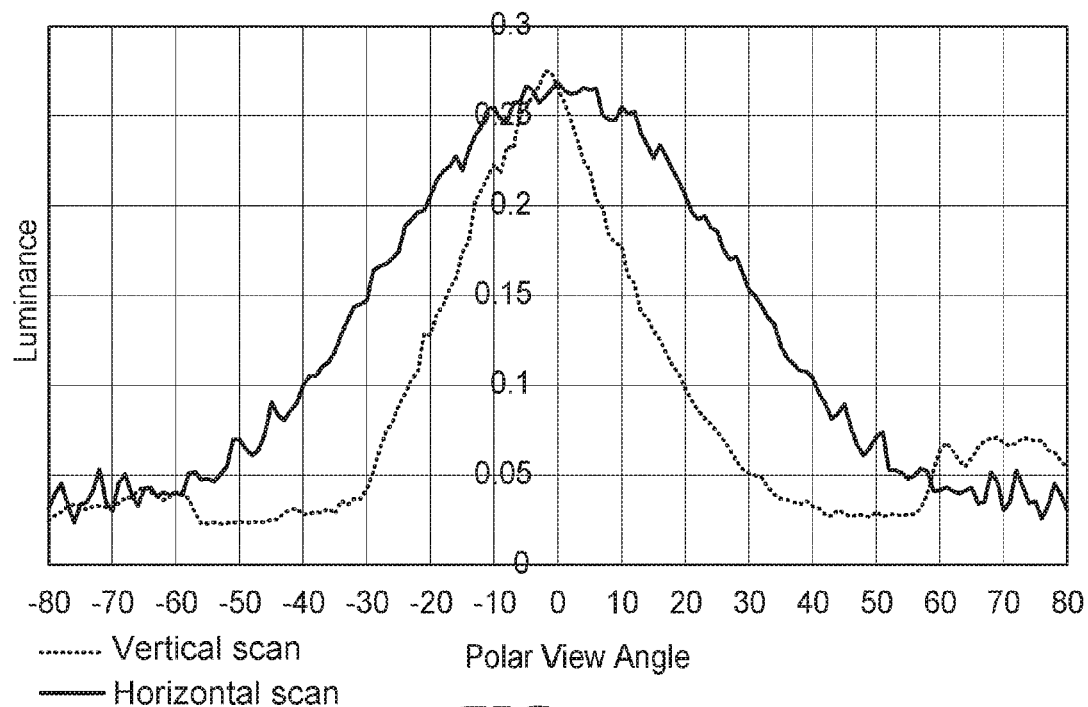
FIG. 11 is a plot showing horizontal and vertical scans of Example 3.

The horizontal and vertical light output scans were computed as before and are shown in FIG. 11.

This result represents a significant improvement in the symmetry of viewing a display, over a conventional turning film.

A further computer model was carried out, simulating a defect on the lightguide top surface. Images were generated of the defect looking through the film, to discern the ability of the film to diffuse the defect image. In this example, the defect was significantly less visible than in Example 1.

Example 4

The computer model was exercised as in Example 2 except that the structures of the top film were prisms with linear facets, an apex angle (i.e., included angle) of 100 degrees, and a pitch of 24 microns.

Figure 12:
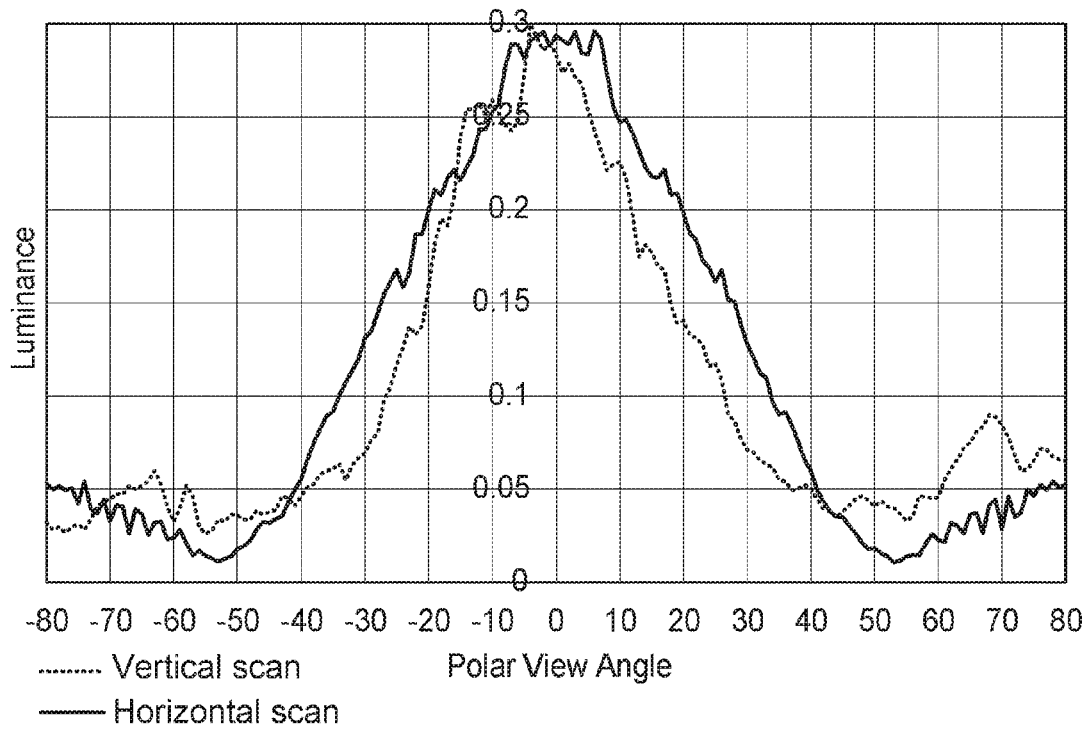
FIG. 12 is a plot showing horizontal and vertical scans of Example 4.

The horizontal and vertical light output scans were computed as before and are shown in FIG. 12.

This result represents a significant improvement in the symmetry of viewing a display, over a conventional turning film.

A further computer model was carried out, simulating a defect on the lightguide top surface. Images were generated of the defect looking through the film, to discern the ability of the film to diffuse the defect image. In this example, the defect was significantly less visible than in Example 1, but more distinctly visible than in Examples 2 and 3.

Example 5

The computer model was exercised as in Example 2 except that the structures on the bottom were inverted asymmetric prisms having one flat facet with chord base angle of 70 degrees and a second curved facet with chord base angle of 60.5 degrees and a facet radius of curvature of 70 microns. The structures on the bottom were oriented such that the flat facets were facing toward the incoming light from the lightguide.

Figure 13:
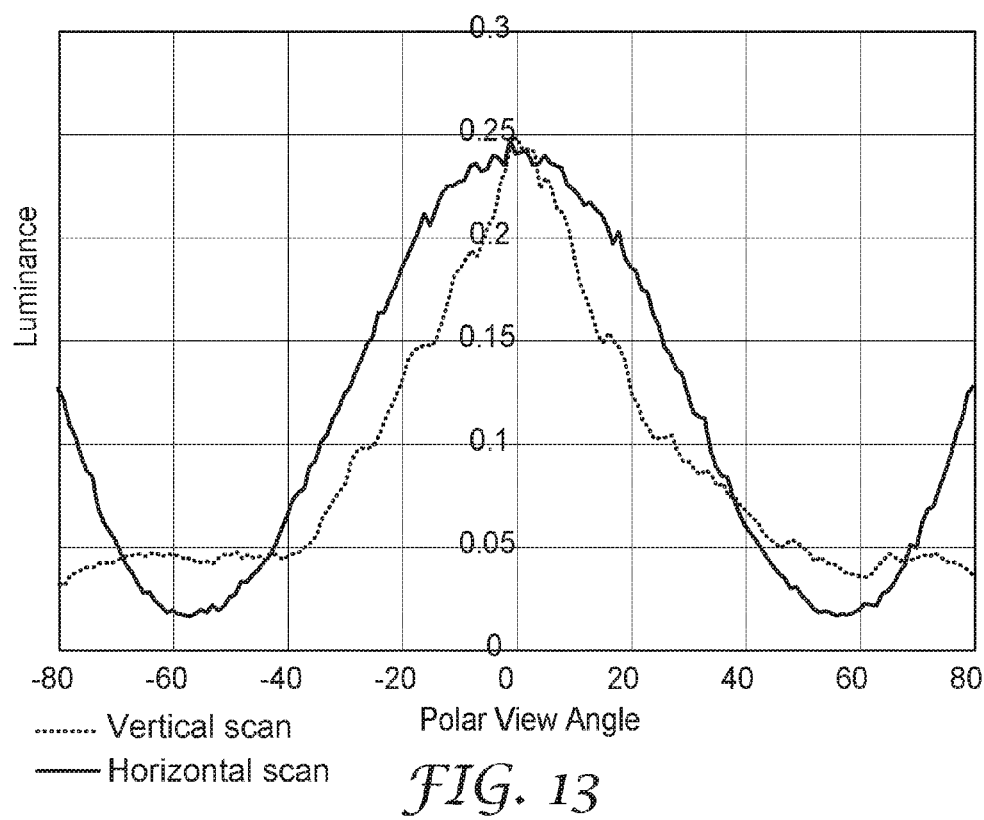
FIG. 13 is a plot showing horizontal and vertical scans of Example 5.

The horizontal and vertical light output scans were computed as before and are shown in FIG. 13.

This result represents a significant improvement in the symmetry of viewing a display, over a conventional turning film.

Example 6

The computer model was exercised as before but with the top structures of Example 3 and the bottom structures of Example 5.

Figure 14:
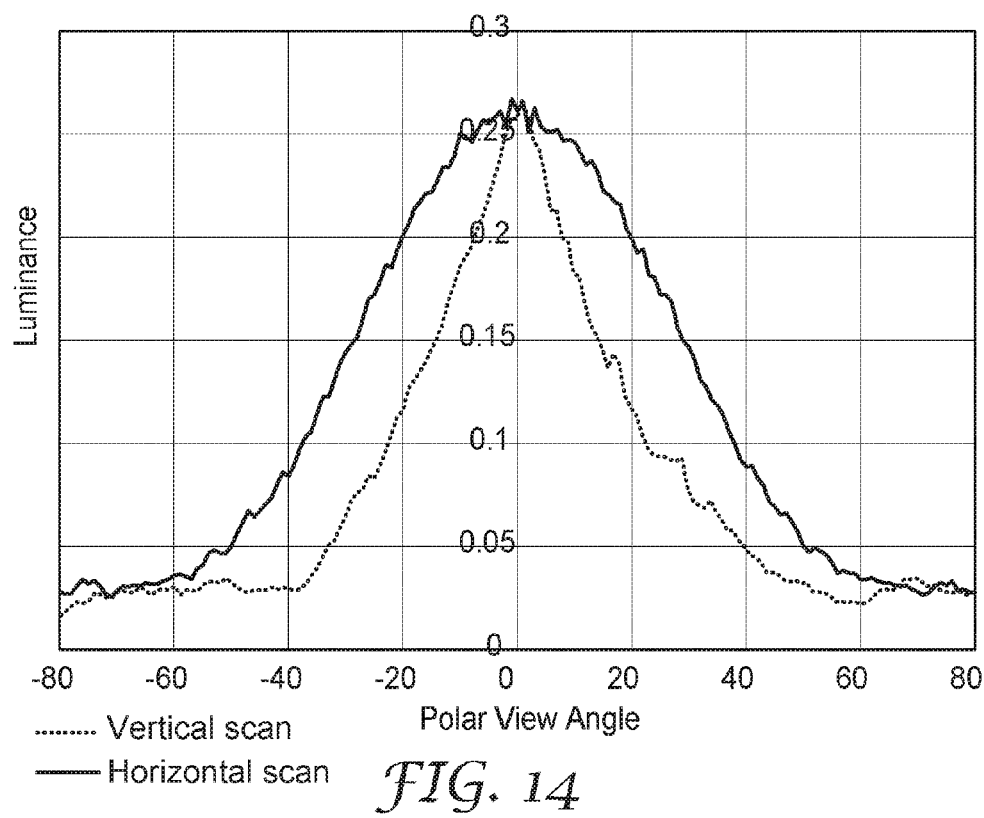
FIG. 14 is a plot showing horizontal and vertical scans of Example 6.

The horizontal and vertical light output scans were computed as before and are shown in FIG. 14.

This result represents a significant improvement in the symmetry of viewing a display, over a conventional turning film.

Example 7

The computer model was exercised as before but with the top structures of Example 4 and the bottom structures of Example 5.

Figure 15:
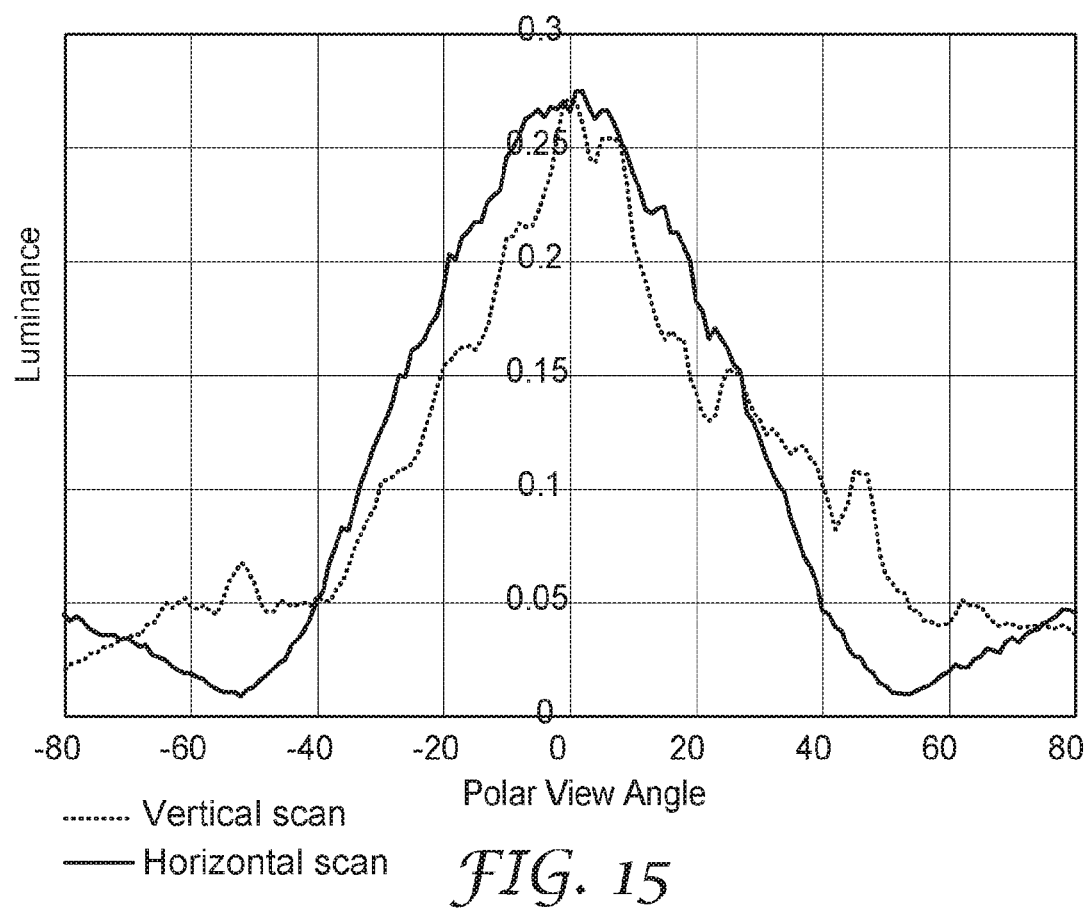
FIG. 15 is a plot showing horizontal and vertical scans of Example 7.

The horizontal and vertical light output scans were computed as before and are shown in FIG. 15.

This result represents a significant improvement in the symmetry of viewing a display, over a conventional turning film.

The following are exemplary embodiments according to the present disclosure:

Item 1. An optical film comprising:
a structured top surface comprising a plurality of substantially linear parallel top structures extending along a first direction, each top structure having a cylindrical surface having a radius of curvature R and a height h, h/R not greater than about 0.4; and
a structured bottom surface comprising a plurality of substantially linear parallel spaced apart bottom structures extending along a second direction different from the first direction, each bottom structure comprising opposing first and second faces, the first face being substantially flat, the second face being curved, a spacing between adjacent bottom structures being in a range from about 0.5 microns to about 3 microns.

Item 2. The optical film of item 1 further comprising a reflective polarizer disposed between the structured top and bottom surfaces, the reflective polarizer substantially reflecting light having a polarization state along a third direction and substantially transmitting light having a polarization state along a fourth direction different from the third direction.

Item 3. The optical film of item 1, wherein the third direction is along one of the first and second directions and the fourth direction is along the other one of the first and second directions.

Item 4. An optical film comprising a structured surface comprising a plurality of substantially linear parallel structures extending along a first direction, each structure comprising opposing first and second faces extending from respective opposite first and second ends of a base of the structure and meeting at a peak of the structure, such that in a cross-sectional view of the optical film in a direction perpendicular to the first direction, the first face is a piecewise curved arc having a plurality of centers of curvature where at least one is offset from a perpendicular bisector of a line connecting the first end of the base to the peak of the structure.

Item 5. A backlight comprising:
a light source;
a lightguide having an input surface proximate the light source and an output surface; and the optical film of item 4 disposed on the outer surface, the structured surface facing the output surface.

Item 6. An optical film comprising:
a structured top surface comprising a plurality of substantially linear parallel top structures extending along a first direction, each top structure comprising opposing first and second substantially flat faces meeting at a peak of the structure and forming a peak angle, the peak angle in a range from about 90 degrees to about 110 degrees; and
a structured bottom surface comprising a plurality of substantially linear parallel bottom structures extending along a second direction different from the first direction, each bottom structure comprising opposing first and second faces extending from respective opposite first and second ends of a base of the structure and meeting at a peak of the structure, such that in a cross-sectional view of the structured bottom surface in a direction perpendicular to the second direction, the first face is substantially a straight line making a first angle with the base in a range from about 50 degrees to about 70 degrees, the second face is an arc having a radius of curvature in a range from about 40 microns to about 100 microns, and a straight line connecting the second end of the base to the peak of the structure makes a second angle with the base in a range from about 60 degrees to about 80 degrees.

Item 7. A backlight comprising:
a light source;
a lightguide having an input surface proximate the light source and an output surface; and an optical film disposed on the output surface and comprising:
  a bottom layer comprising a plurality of substantially linear parallel spaced apart bottom structures extending along a first direction and facing the output surface of the lightguide, a spacing between adjacent bottom structures being in a range from about 0.5 microns to about 3 microns;
  a top layer comprising a plurality of substantially linear parallel spaced apart top structures extending along a second direction different from the first direction and facing away from the output surface of the lightguide, a spacing between adjacent top structures being in a range from about 0.5 microns to about 5 microns; and
  a reflective polarizer disposed between and adhered to the top and bottom layers, the reflective polarizer substantially reflecting light having a polarization state along a third direction and substantially transmitting light having a polarization state along a fourth direction different from the third direction.

Item 8. The backlight of item 7, wherein the third direction is along one of the first and second directions and the fourth direction is along the other one of the first and second directions.

Item 9. The backlight of item 7, wherein the third direction is substantially perpendicular to the fourth direction.

Item 10. The backlight of item 7, wherein the first direction is substantially perpendicular to the second direction.

Item 11. The backlight of item 7 further comprising an optical diffuser for diffusing light emitted by the light source disposed on the opposite side of the optical film from the lightguide.

Item 12. The backlight of item 7, further comprising a buffer layer disposed between the optical film and the lightguide.

Item 13. The backlight of item 12, wherein the buffer layer includes a top structured surface.

Item 14. The backlight of item 13, wherein the structured surface of the buffer layer is a surface diffusing structure.

Item 15. The backlight of item 14, wherein the structured surface of the buffer layer has a higher haze portion and a lower haze portion, and the high haze portion is disposed nearest an edge of the buffer layer proximate the light source.

Item 16. The backlight of item 15, wherein the high haze portion covers no more than 10% of the top surface of the buffer layer.

Item 17. An optical film comprising:
a structured top surface comprising a plurality of substantially parallel top structures extending linearly along a first direction and arranged with a first pitch; and
a structured bottom surface comprising a plurality of substantially parallel bottom structures extending linearly along a second direction different from the first direction and arranged with a second pitch, a spacing between adjacent bottom structures in a range from about 0.5 microns to about 3 microns, each top and bottom structure comprising opposing first and second faces extending from respective opposite first and second ends of a base of the structure and meeting at a peak of the structure, such that in a cross-sectional view of the structure in a direction perpendicular to the linear extent of the structure, the first and second faces are arcs having a radius of curvature, a ratio of the radius of curvature to the pitch of the structure in a range from about 0.8 to about 10 for each top structure, and about 1.5 to about 20 for each bottom structure.

Item 18. The optical film of item 17, wherein the structured top surface includes a surface diffusing structure.

Item 19. The optical film of item 18, wherein the surface diffusing structure has a first slope distribution measured along the first direction and a second slope distribution measured along the second direction, and wherein at least 50% of the magnitude of a first slope distribution is greater than 1 degree.

Item 20. The optical film of item 19, wherein at least 50% of the magnitude of the second slope distribution is less than 0.1 degrees.

Item 21. The optical film of item 17, wherein in a cross-sectional view of the structure in a direction perpendicular to the linear extent of the structure, straight lines connecting first and second ends of the base of each structure to the peak of the structure form an angle therebetween in a range from about 60 degrees to about 130 degrees for each top and bottom structure.

Item 22. The optical film of item 17, wherein an angle between the first and second directions is from about 78 degrees to about 90 degrees.

Item 23. The optical film of item 17 further comprising a reflective polarizer disposed between the structured top and bottom surfaces, the reflective polarizer substantially reflecting light having a polarization state along a third direction and substantially transmitting light having a polarization state along a fourth direction different from the third direction.

Item 24. The optical film of item 23, wherein the first direction is substantially perpendicular to the second direction, the third direction is substantially perpendicular to the fourth direction, and one of the first and second directions makes an angle with one of the third and fourth directions between about 0 to 12 degrees.

Item 25. The optical film of item 17, such that in a cross-sectional view of each bottom structure in a direction perpendicular to the linear extent of the structure, the peak of the structure is an arc having a radius of curvature in a range from about 0.1 microns to about 5 microns.

Item 26. The optical film of item 25, wherein in a cross-sectional view of each bottom structure in a direction perpendicular to the linear extent of the structure, first and second straight lines going through respective first and second ends of the base of the structure and tangent to respective sides of the curved peak of the structure form an angle therebetween that is in a range from about 50 degrees to about 70 degrees.

Item 27. The optical film of item 17, wherein in a cross-sectional view of each structure in a direction perpendicular to the linear extent of the structure, a straight line connecting each end of the base of the structure to the peak of the structure forms an angle with the base of the structure between about 5 to 60 degrees for each top structure, and about 25 to 88 degrees for each bottom structure.

Item 28. The optical film of item 17, wherein in a cross-sectional view of each structure in a direction perpendicular to the linear extent of the structure, a straight line connecting each end of the base of the structure to the peak of the structure forms an angle with the base of the structure between about 30 to 50 degrees for each top structure, and about 50 to 70 degrees for each bottom structure.

Item 29. The optical film of item 17, wherein in a cross-sectional view of each top and bottom structure in a direction perpendicular to the linear extent of the structure, straight lines connecting first and second ends of the base of the structure to the peak of the structure make a same angle with the base of the structure.

Item 30. The optical film of item 17, wherein in each cross-sectional view of each structure in a direction perpendicular to the linear extent of the structure, a straight line connecting each end of the base of the structure to the peak of the structure makes an angle with the base of the structure between about 35 to 45 degrees for each top structure and about 55 to 65 degrees for each bottom structure.

Item 31. The optical film of item 17, such that in a cross-sectional view of each top and bottom structure in a direction perpendicular to the linear extent of the structure, any radius of curvature at the peak of the structure is smaller than the radius of curvature of the first and second faces of the structure.

Item 32. The optical film of item 17, such that in each cross-sectional view of each top and bottom structure in a direction perpendicular to the linear extent of the structure, the first and second faces of the structure are arcs not having a same center of curvature.

Item 33. The optical film of item 17, wherein each of the first and second pitches is between about 10 to 100 microns.

Item 34. The optical film of item 17, wherein each of the first and second pitches is between about 10 to 50 microns.

Item 35. The optical film of item 17, wherein in a cross-sectional view of each structure in a direction perpendicular to the linear extent of the structure, the first and second faces of the structure have a same radius of curvature.

Item 36. The optical film of item 17, wherein in a cross-sectional view of each structure in a direction perpendicular to the linear extent of the structure, the radius of curvature is between about 20 to 40 microns for each top structure, and about 60 to 80 microns for each bottom structure.

Item 37. The optical film of item 17, wherein in a cross-sectional view of each structure in a direction perpendicular to the linear extent of the structure, the ratio of the radius of curvature of the first and second faces of the structure to the pitch of the structure is between about 1 to about 3 for each top structure, and about 2 to about 5 for each bottom structure.

Item 38. The optical film of item 17, wherein a height of at least one structure in the pluralities of top and bottom structures varies along a linear extent of the structure.

Item 39. The optical film of item 17, wherein the plurality of substantially parallel top structures are arranged with a variable first pitch.

Item 40. The optical film of item 17, wherein the plurality of substantially parallel bottom structures are arranged with a variable second pitch.

Item 41. The optical film of item 17 further comprising an optical diffuser for diffusing light.

Item 42. The optical film of item 17 further comprising a quarter wavelength layer.

Item 43. The optical film of item 42, wherein the quarter wavelength layer is disposed between the structured top and bottom surfaces.

Item 44. The optical film of item 42, wherein the quarter wavelength layer is disposed on the structured top surface opposite the structured bottom surface.

Item 45. The optical film of item 17 further comprising a polarization management optical stack comprising:
a reflective polarizer substantially reflecting light having a polarization state along a third direction and substantially transmitting light having a polarization state along a fourth direction different from the third direction; and
a quarter wavelength layer.

Item 46. The optical film of item 45, wherein the reflective polarizer is adhered to the quarter wavelength layer.

Item 47. The optical film of item 45, wherein the polarization management optical stack is disposed on the structured top surface opposite the structured bottom surface, the quarter wavelength layer disposed between the reflective polarizer and the structured top surface.

Item 48. The optical film of item 45, wherein the polarization management optical stack is disposed between the structured top and bottom surfaces, the quarter wavelength layer disposed between the reflective polarizer and the structured top surface.

Item 49. The optical film of item 45, wherein the polarization management optical stack is disposed between the structured top and bottom surfaces, the quarter wavelength layer disposed between the reflective polarizer and the structured bottom surface.

Item 50. The optical film of item 45 further comprising an optically birefringent substrate disposed between the structured top and bottom surfaces.

Item 51. A backlight comprising:
a light source;
a lightguide having an input surface proximate the light source and an output surface; and
the optical film of item 17 disposed on the outer surface, the structured bottom surface facing the output surface.

Item 52. A backlight comprising:
a light source;
a lightguide having an input surface proximate the light source and an output surface; and
an optical film disposed on the output surface and comprising:
  a first structured surface comprising a plurality of substantially linear parallel first structures extending along a first direction and facing the output surface of the lightguide;
  a second structured surface comprising a plurality of substantially linear parallel second structures extending along a second direction different from the first direction and facing away from the output surface of the lightguide, each first and second structure comprising opposing curved first and second faces extending from respective opposite first and second ends of a base of the structure and meeting at a peak of the structure, the curved first and second faces having different axes of curvature; and
  a reflective polarizer substantially reflecting light having a polarization state along a third direction and substantially transmitting light having a polarization state along a fourth direction different from the third direction, such that at least 10% of light emitted by the light source and exiting the backlight is recycled by the second structured surface before exiting the backlight.

Item 53. The backlight of item 52, wherein the lightguide comprises a back surface opposite the output surface, and wherein the backlight further comprises a reflective layer disposed adjacent the back surface of the lightguide.

Item 54. A multilayer optical film comprising:
an optically birefringent substrate;
a plurality of substantially parallel top structures disposed on the optically birefringent substrate and extending linearly along a first direction;
a plurality of substantially parallel bottom structures disposed on the optically birefringent substrate opposite the top structures and extending linearly along a second direction different from the first direction;
a reflective polarizer disposed between the top structures and the birefringent substrate, the reflective polarizer substantially reflecting light having a polarization state along a third direction and substantially transmitting light having a polarization state along a fourth direction different from the third direction; and
a quarter wavelength layer disposed between the top structures and the reflective polarizer; wherein
each top and bottom structure comprises opposing curved first and second faces extending from respective opposite first and second ends of a base of the structure and meeting at a peak of the structure, the curved first and second faces having different axes of curvature.

Descriptions for elements in figures should be understood to apply equally to corresponding elements in other figures, unless indicated otherwise. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. An optical film comprising:
    a structured top surface comprising a plurality of substantially linear parallel top structures extending along a first direction, each top structure having a cylindrical surface having a radius of curvature R and a height h, h/R not greater than about 0.4;
    a structured bottom surface comprising a plurality of substantially linear parallel spaced apart bottom structures extending along a second direction different from the first direction, each bottom structure comprising opposing first and second faces, the first face being substantially flat, the second face being curved, a spacing between adjacent bottom structures being in a range from about 0.5 microns to about 3 microns; and
    a reflective polarizer disposed between the structured top and bottom surfaces, the reflective polarizer substantially reflecting light having a polarization state along a third direction and substantially transmitting light having a polarization state along a fourth direction different from the third direction.

2. The optical film of claim 1, wherein the third direction is along one of the first and second directions and the fourth direction is along the other one of the first and second directions.

3. A backlight comprising:
    a light source;
    a lightguide having an input surface proximate the light source and an output surface; and
    an optical film disposed on the output surface and comprising:
        a bottom layer comprising a plurality of substantially linear parallel spaced apart bottom structures extending along a first direction and facing the output surface of the lightguide, a spacing between adjacent bottom structures being in a range from about 0.5 microns to about 3 microns;
        a top layer comprising a plurality of substantially linear parallel spaced apart top structures extending along a second direction different from the first direction and facing away from the output surface of the lightguide, a spacing between adjacent top structures being in a range from about 0.5 microns to about 5 microns; and
        a reflective polarizer disposed between and adhered to the top and bottom layers, the reflective polarizer substantially reflecting light having a polarization state along a third direction and substantially transmitting light having a polarization state along a fourth direction different from the third direction.

4. The backlight of claim 3, wherein the third direction is along one of the first and second directions and the fourth direction is along the other one of the first and second directions.

5. The backlight of claim 3, wherein the third direction is substantially perpendicular to the fourth direction.

6. The backlight of claim 3, wherein the first direction is substantially perpendicular to the second direction.

7. The backlight of claim 3 further comprising an optical diffuser for diffusing light emitted by the light source disposed on the opposite side of the optical film from the lightguide.

8. The backlight of claim 3, further comprising a buffer layer disposed between the optical film and the lightguide.

9. The backlight of claim 8, wherein the buffer layer includes a top structured surface.

10. The backlight of claim 9, wherein the structured surface of the buffer layer is a surface diffusing structure.

11. The backlight of claim 10, wherein the structured surface of the buffer layer has a higher haze portion and a lower haze portion, and the high haze portion is disposed nearest an edge of the buffer layer proximate the light source.

12. The backlight of claim 11, wherein the high haze portion covers no more than 10% of the top surface of the buffer layer.

13. A multilayer optical film comprising:
    an optically birefringent substrate;
    a plurality of substantially parallel top structures disposed on the optically birefringent substrate and extending linearly along a first direction;
    a plurality of substantially parallel bottom structures disposed on the optically birefringent substrate opposite the top structures and extending linearly along a second direction different from the first direction;
    a reflective polarizer disposed between the top structures and the birefringent substrate, the reflective polarizer substantially reflecting light having a polarization state along a third direction and substantially transmitting light having a polarization state along a fourth direction different from the third direction; and
    a quarter wavelength layer disposed between the top structures and the reflective polarizer; wherein
    each top and bottom structure comprises opposing curved first and second faces extending from respective opposite first and second ends of a base of the structure and meeting at a peak of the structure, the curved first and second faces having different axes of curvature.

* * * * *